US012794139B2

(12) United States Patent
Ito et al.

(10) Patent No.: US 12,794,139 B2
(45) Date of Patent: Nov. 10, 2026

(54) METAMATERIAL AND ANTENNA

(71) Applicant: Mitsubishi Electric Corporation, Tokyo (JP)

(72) Inventors: Yohei Ito, Tokyo (JP); Takeshi Shiode, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 177 days.

(21) Appl. No.: 18/714,106

(22) PCT Filed: Dec. 7, 2021

(86) PCT No.: PCT/JP2021/044862
§ 371 (c)(1),
(2) Date: May 29, 2024

(87) PCT Pub. No.: WO2023/105612
PCT Pub. Date: Jun. 15, 2023

(65) Prior Publication Data

US 2025/0038422 A1 Jan. 30, 2025

(51) Int. Cl.
*H01Q 15/00* (2006.01)
*H01Q 1/42* (2006.01)
*H01Q 15/14* (2006.01)

(52) U.S. Cl.
CPC ........... *H01Q 15/0086* (2013.01); *H01Q 1/42* (2013.01); *H01Q 15/14* (2013.01)

(58) Field of Classification Search
CPC .. H01Q 15/0086; H01Q 15/0026; H01Q 1/42; H01Q 1/14
See application file for complete search history.

(56) References Cited

U.S. PATENT DOCUMENTS 11,011,282 B1 * 5/2021 Dong ........................ H01P 7/08
2012/0075692 A1 * 3/2012 Baik ..................... H01P 1/2005 359/344

(Continued)

FOREIGN PATENT DOCUMENTS

CN 102683846 A * 9/2012
CN 120127412 A * 6/2025 ............. H01Q 21/00

(Continued)

OTHER PUBLICATIONS

International Search Report and Written Opinion mailed on Feb. 22, 2022, received for International Patent Application No. PCT/JP2021/044862, filed on Dec. 7, 2021, 8 pages including English Translation.

(Continued)

*Primary Examiner* — Seokjin Kim
(74) *Attorney, Agent, or Firm* — XSENSUS LLP

(57) ABSTRACT

A metamaterial includes a plurality of films arranged with main surfaces thereof facing each other, a plurality of micro-resonators included in the plurality of films, and a stress relieving member disposed between two mutually-adjacent films of the plurality of films. The plurality of films transmit a target electromagnetic wave that is an electromagnetic wave having a wavelength within a target wavelength range. The plurality of micro-resonators resonate with the target electromagnetic wave. The stress relieving member transmits the target electromagnetic wave and has a lower elastic modulus than the plurality of films.

17 Claims, 15 Drawing Sheets

(56) References Cited

U.S. PATENT DOCUMENTS

| | | | | |
|---|---|---|---|---|
| 2012/0212395 | A1* | 8/2012 | Sanada | H01Q 15/10 343/912 |
| 2015/0229032 | A1* | 8/2015 | Liu | H01Q 3/12 343/766 |
| 2015/0255877 | A1* | 9/2015 | Liu | H01Q 15/02 343/909 |
| 2018/0337447 | A1* | 11/2018 | Shinojima | H01Q 17/008 |
| 2019/0363448 | A1 | 11/2019 | Yemelong et al. | |
| 2020/0253096 | A1* | 8/2020 | Mcbain | H05K 9/0088 |
| 2025/0016970 | A1* | 1/2025 | Anzelmo | B60C 23/0428 |

FOREIGN PATENT DOCUMENTS

| | | | | | |
|---|---|---|---|---|---|
| EP | 2919322 | A1 | * | 9/2015 | H01Q 15/006 |
| EP | 2919322 | B1 | | 10/2018 | |
| EP | 4401524 | A1 | * | 7/2024 | H05K 9/0084 |
| JP | 2017-175201 | A | | 9/2017 | |
| JP | 2018-196052 | A | | 12/2018 | |
| JP | 2020-509687 | A | | 3/2020 | |
| KR | 200493483 | Y1 | * | 4/2021 | H05K 9/0081 |
| WO | 2011/070736 | A1 | | 6/2011 | |
| WO | WO-2021169228 | A1 | * | 9/2021 | H01Q 15/0086 |
| WO | WO-2021206846 | A1 | * | 10/2021 | C08L 83/04 |
| WO | WO-2024081161 | A1 | * | 4/2024 | C08K 3/041 |

OTHER PUBLICATIONS

Extended European Search Report issued Dec. 18, 2024, in the corresponding European Patent Application No. 21967116.1, 8pp.

* cited by examiner

METAMATERIAL AND ANTENNA

CROSS-REFERENCE TO RELATED APPLICATION

This application is a national stage application, pursuant to 35 U.S.C. § 371, of International Patent Application No. PCT/JP2021/044862, filed Dec. 7, 2021, the entire contents of which are incorporated herein by reference.

TECHNICAL FIELD

The present disclosure relates to a metamaterial and an antenna including the metamaterial.

BACKGROUND ART

Metamaterials having adjustable electromagnetic properties, such as permittivity and magnetic permeability, are expected to be applied to various technologies, such as optical camouflage, radar avoidance, and small antennae. An example of the metamaterials is disclosed in Patent Literature 1. A metamaterial film disclosed in Patent Literature 1 includes a resin film that allows transmission of an electromagnetic wave having a certain wavelength, more specifically, a wavelength of 400 nm or more and 2,000 nm or less, and a plurality of micro-resonators included in the resin film and configured to resonate with the electromagnetic wave having a certain wavelength.

CITATION LIST

Patent Literature

Patent Literature 1: Japanese Patent Application Publication No. 2017-175201

SUMMARY OF INVENTION

Technical Problem

When a laminate of the metamaterial films disclosed in Patent Literature 1 is bent into, for example, a partially cylindrical shape, the curvature of an outer circumferential surface is larger than the curvature of an inner circumferential surface. As a result, the metamaterial films have a largest tensile stress on the outer circumferential surface and a largest compressive stress on the inner circumferential surface.

The increased tensile stress or compressive stress increases force applied to the micro-resonators included in the resin film, which may deform the micro-resonators. The desired electromagnetic properties become unattainable when the micro-resonators deform. This makes attachment of the laminate of the metamaterial films to a curved surface problematic.

In view of the above circumstances, an objective of the present disclosure is to provide a metamaterial attachable to a curved surface, and an antenna including the metamaterial.

Solution to Problem

To achieve the above objective, a metamaterial according to an aspect of the present disclosure includes a plurality of films, a plurality of micro-resonators, and a stress relieving member. The plurality of films transmit a target electromagnetic wave that is an electromagnetic wave having a frequency within a target frequency range, and are arrayed with main surfaces of the plurality of films facing each other. The plurality of micro-resonators are each made of an electrically conductive material and included in each of the plurality of films, and resonate with the target electromagnetic wave. The stress relieving member is disposed between two mutually-adjacent films of the plurality of films, transmits the target electromagnetic wave, and has a lower elastic modulus than the plurality of films.

Advantageous Effects of Invention

The metamaterial according to the above aspect of the present disclosure includes the stress relieving member disposed between the mutually-adjacent films and having the lower elastic modulus than the films. When stresses generated in the films upon bending of the metamaterial are transferred to the stress relieving member, the stress relieving member deforms. This suppresses transfer, between the films, of the stresses generated in the films upon bending of the metamaterial and reduces force applied to the micro-resonators included in each of the films, compared with a laminate of the films alone. As a result, the metamaterial becomes attachable to a curved surface.

DESCRIPTION OF EMBODIMENTS

Figure 1:
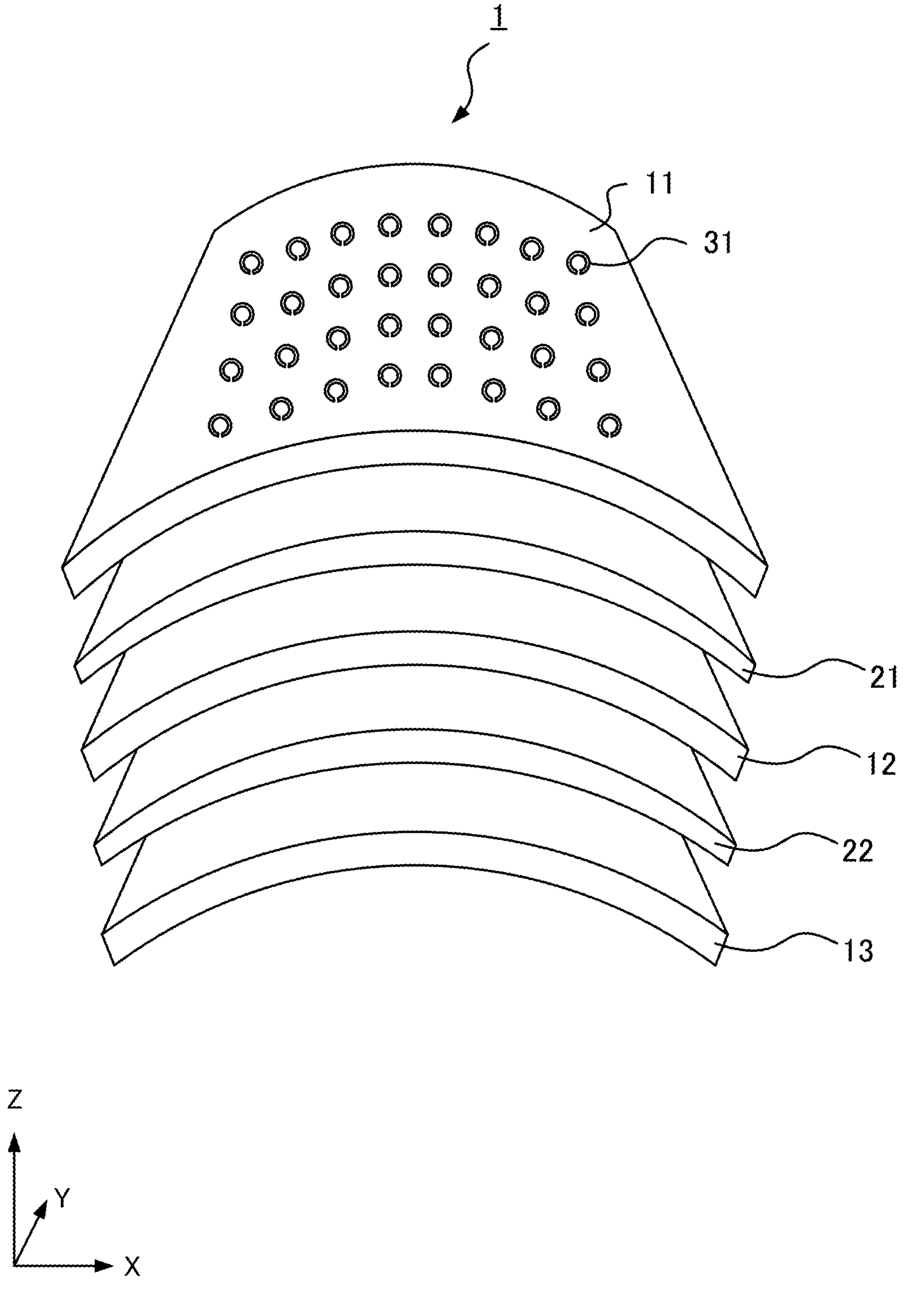
FIG. 1 is an exploded perspective view of a metamaterial according to Embodiment 1.

A metamaterial and an antenna according to embodiments of the present disclosure are described in detail below with reference to the drawings. In the drawings, components that are the same or equivalent are assigned the same reference sign.

Embodiment 1

Figure 2:
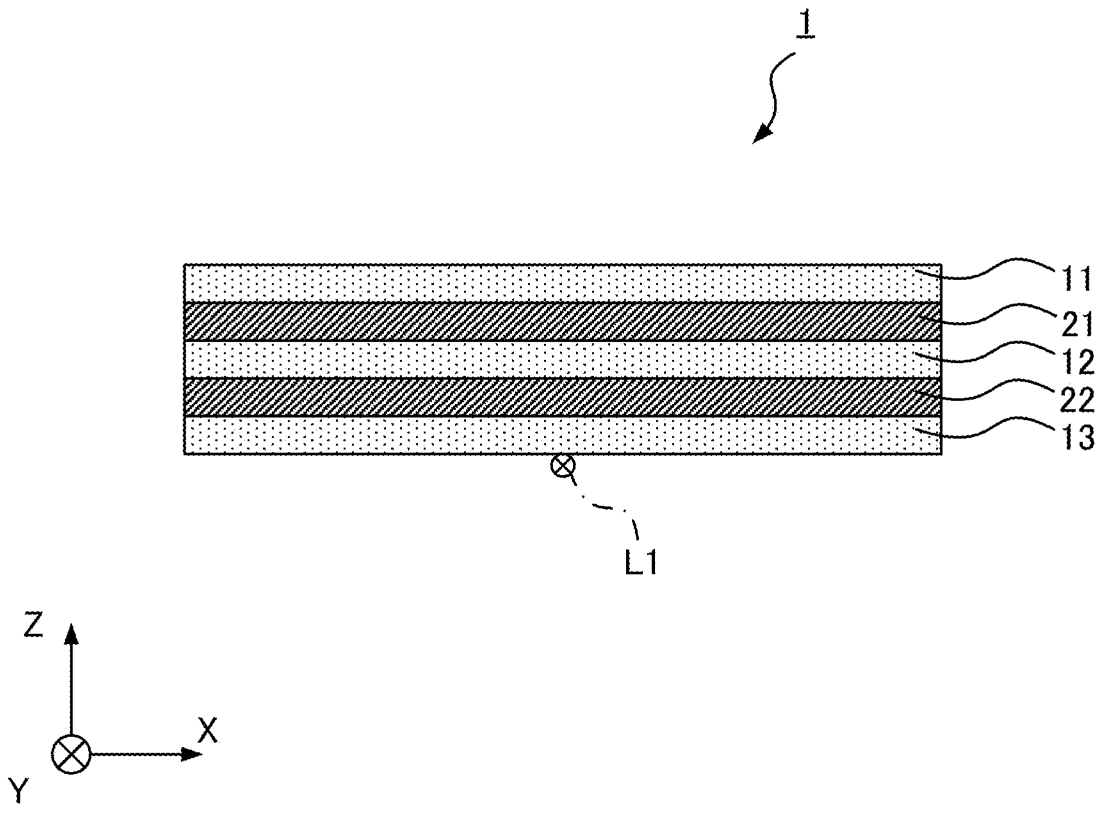
FIG. 2 is a sectional view of the metamaterial according to Embodiment 1.

A metamaterial 1 according to Embodiment 1 is described using, as an example of the metamaterial 1, a metamaterial structure to be used to extend a scan range of an antenna. The metamaterial 1 according to Embodiment 1 as illustrated in FIGS. 1 and 2 includes a plurality of films 11, 12, and 13 arrayed with main surfaces thereof facing each other, and a plurality of micro-resonators 31 included in each of the films 11, 12, and 13. The films 11, 12, and 13 transmit a target electromagnetic wave that is an electromagnetic wave having a wavelength within a target wavelength range. The metamaterial 1 further includes a stress relieving member 21 disposed between the mutually-adjacent films 11 and 12, and a stress relieving member 22 disposed between the mutually-adjacent films 12 and 13.

As illustrated in FIG. 2, in Embodiment 1, the films 11, 12, and 13 and the stress relieving members 21 and 22 have a flat-plate shape when no external force is applied. An array direction of the plurality of films 11, 12, and 13 is set as a Z-axis, an axis orthogonal to the Z-axis and included in a plane parallel to side surfaces of the film 11 is set as an X-axis, and an axis orthogonal to the X-axis and the Z-axis is set as a Y-axis.

The films 11, 12, and 13 are arrayed in the Z-axis direction with the main surfaces facing each other. Specifically, the films 11, 12, and 13 each have two main surfaces orthogonal to the Z-axis direction in a state as illustrated in FIG. 2. The films 11, 12, and 13 are arrayed such that a negative Z-axis direction side main surface of the film 11 faces a positive Z-axis direction side main surface of the film 12, and a negative Z-axis direction side main surface of the film 12 faces a positive Z-axis direction side main surface of the film 13. The stress relieving members 21 and 22 are disposed between the films 11, 12, and 13 arrayed as described above.

The films 11, 12, and 13 transmit the target electromagnetic wave, such as an electromagnetic wave within a gigahertz range, more specifically, a millimeter-waveband electromagnetic wave having a wavelength of 1 mm or more and 10 mm or less. The films 11, 12, and 13 are made of resin, such as polyimide, polyolefin, cyclic polyolefin, polymethyl methacrylate, polyester resin, cycloaliphatic epoxy, fluoropolymer, or thermoplastic elastomer. The films 11, 12, and 13 are made of resin as described above and are bendable.

The plurality of micro-resonators 31 is two-dimensionally arrayed on a surface of each of the films 11, 12, and 13, or is two-dimensionally or three-dimensionally arrayed inside each of the films 11, 12, and 13. When the plurality of micro-resonators 31 is included inside the film 11, for example, the plurality of micro-resonators 31 may be arranged on a surface of a film layer included in the film 11, another film layer included in the film 11 may be laminated thereon, and the film layers may adhere to each other by thermal compression.

Each of the micro-resonators 31 is made of an electrically conductive material and resonates with the target electromagnetic wave. For example, metal, alloy, an electrically conductive metallic oxide, a high polymer semiconductor, and the like are used as the electrically conductive material. The micro-resonator 31 has a shape such that an induced current is generated by resonance when the target electromagnetic wave enters the micro-resonator 31. In Embodiment 1, split-ring resonators having a partially-circular shape are used as the micro-resonators 31.

By inclusion of the plurality of micro-resonators 31 in the films 11, 12, and 13, desired electromagnetic properties of the metamaterial 1, more specifically, desired permittivity and magnetic permeability of the metamaterial 1 can be achieved. Setting of each of the permittivity and magnetic permeability of the metamaterial 1 to be a negative value allows a refractive index of the metamaterial 1 to have a negative value, for example. The thicknesses of the films 11, 12, and 13 in the Z-axis direction and the thicknesses of the stress relieving members 21 and 22 in the Z-axis direction when no external force is applied as illustrated in FIG. 2 may be regulated in accordance with the desired electromagnetic properties of the metamaterial 1.

The stress relieving members 21 and 22 are disposed between the films 11, 12, and 13 and transmit the target electromagnetic wave. Specifically, the stress relieving member 21 is disposed between the films 11 and 12 and in contact with the films 11 and 12. The stress relieving member 22 is disposed between the films 12 and 13 and in contact with the films 12 and 13. The contact includes direct contact and indirect contact via another material. The stress relieving members 21 and 22 may be made of a material that transmits electromagnetic waves including the target electromagnetic wave.

The stress relieving members 21 and 22 have a lower elastic modulus than the films 11, 12, and 13. Thus, when receiving stresses generated in the films 11, 12, and 13 upon bending of the metamaterial 1, the stress relieving members 21 and 22 deform. Deformation of the stress relieving members 21 and 22 suppresses transfer, among the films 11, 12, and 13, of the stresses generated upon bending of the metamaterial 1.

The stress relieving members 21 and 22 are preferably made of a material adherent or pressure-sensitively adherent to the films 11, 12, and 13, such as an acrylic pressure-sensitive adhesive, a silicone pressure-sensitive adhesive, a urethane pressure-sensitive adhesive, a rubber pressure-sensitive adhesive, a silicone adhesive, or an acrylic adhesive. This allows the stress relieving member 21 to attach to the films 11 and 12 and the stress relieving member 22 to attach to the films 12 and 13, and suppresses mutual misalignment of components of the metamaterial 1, more specifically, mutual misalignment of the films 11, 12, and 13 and the stress relieving members 21 and 22.

As illustrated in FIG. 2, the film 13, the stress relieving member 22, the film 12, the stress relieving member 21, and the film 11 are laminated in this order.

Figure 3:
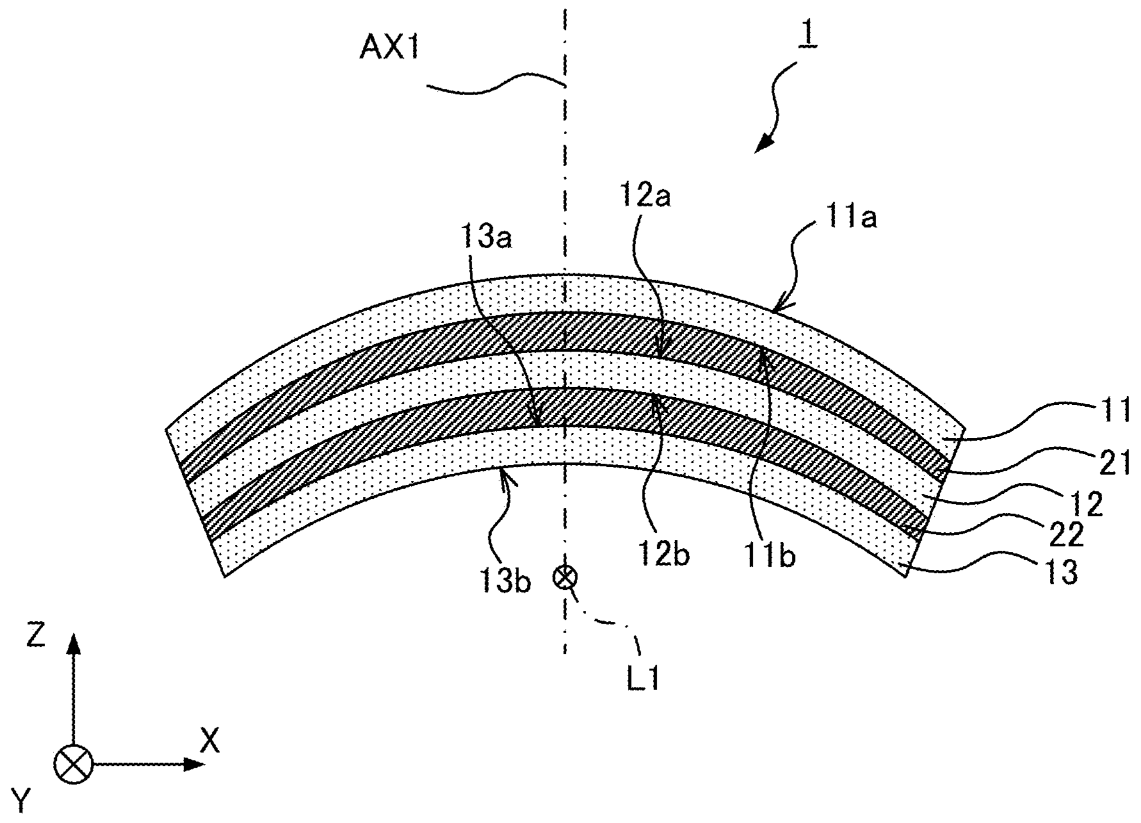
FIG. 3 is a sectional view of the metamaterial according to Embodiment 1.

By applying force to the metamaterial 1 in a state illustrated in FIG. 2 to bend the metamaterial 1 as illustrated in FIG. 3, the metamaterial 1 becomes attachable to a curved surface. Specifically, in the metamaterial 1 as illustrated in FIG. 2, the force is applied, in the positive Z-axis direction along a bending line L1 parallel to the Y-axis, to the center of the metamaterial 1 in the X-axis direction with the edges of the metamaterial 1 in the X-axis direction fixed. As a result, the metamaterial 1 is bent around the bending line L1 as illustrated in FIG. 3.

In the bent metamaterial 1, one main surface of the film 11, more specifically, a positive Z-axis direction side main surface of the film 11 forms a convex surface 11*a* protruding in the Z-axis direction. The other main surface of the film 11, more specifically, the negative Z-axis direction side main surface of the film 11 is positioned on a side opposite to the convex surface 11*a* and forms a concave surface 11*b* recessed in the Z-axis direction. The negative Z-axis direction side main surface of the film 11 is a surface of the film 11 facing the film 12.

Similarly, one main surface of the film 12, more specifically, a positive Z-axis direction side main surface of the film 12 forms a convex surface 12*a* protruding in the Z-axis direction. The positive Z-axis direction side main surface of the film 12 is a surface of the film 12 facing the film 11. The other main surface of the film 12, more specifically, a negative Z-axis direction side main surface of the film 12 is positioned on a side opposite to the convex surface 12*a* and forms a concave surface 12*b* recessed in the Z-axis direction. The negative Z-axis direction side main surface of the film 12 is a surface of the film 12 facing the film 13.

Similarly, one main surface of the film 13, more specifically, a positive Z-axis direction side main surface of the film 13 forms a convex surface 13*a* protruding in the Z-axis direction. The positive Z-axis direction side main surface of the film 13 is a surface of the film 13 facing the film 12. The other main surface of the film 13, more specifically, a negative Z-axis direction side main surface of the film 13 is positioned on a side opposite to the convex surface 13*a*, and forms a concave surface 13*b* recessed in the Z-axis direction.

The desired electromagnetic properties of the metamaterial 1 can be achieved by inclusion of the plurality of micro-resonators 31 in each of the films 11, 12, and 13 bent as described above. An electromagnetic wave that has entered the metamaterial 1 from the film 13 can be refracted in a direction away from a central axis AX1 indicating the center of the metamaterial 1 in the X-axis direction, and can come out of the film 11, for example.

Figure 4:
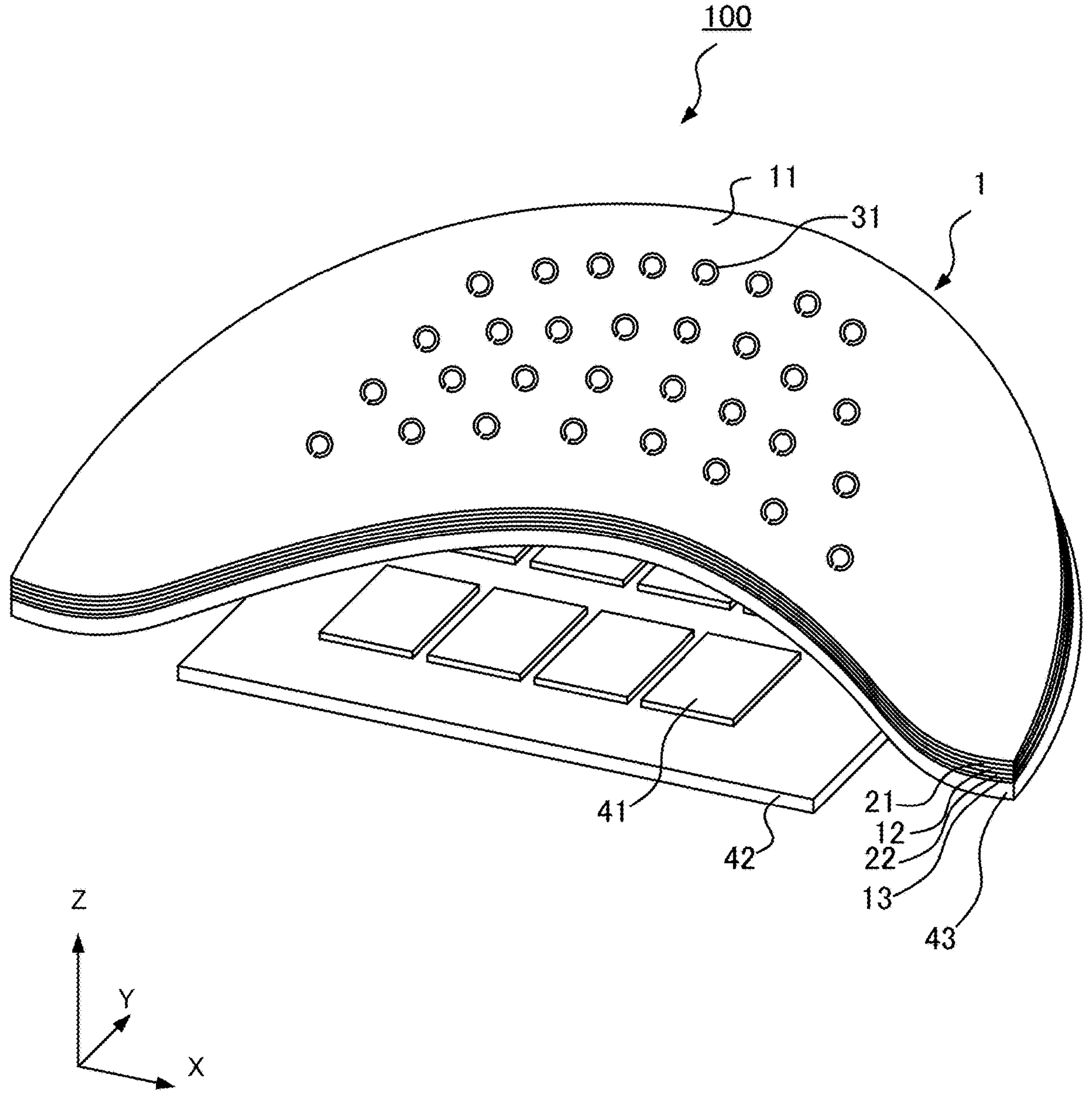
FIG. 4 is a perspective view of an antenna according to Embodiment 1.
Figure 5:
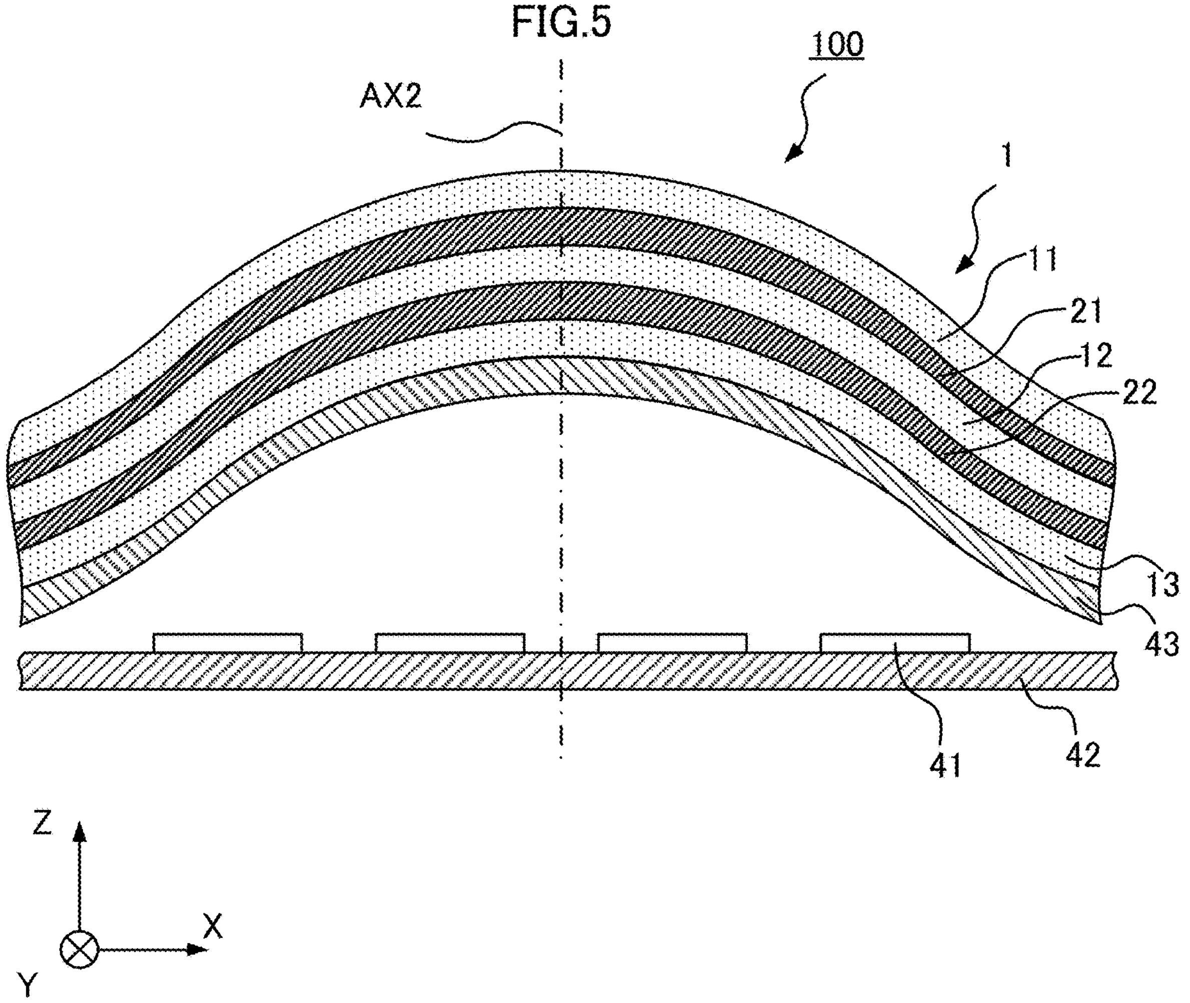
FIG. 5 is a sectional view of the antenna according to Embodiment 1.

The metamaterial 1 including the above structure can be used for various purposes. In one example, the metamaterial 1 may be used in an antenna 100 as illustrated in FIGS. 4 and 5. The antenna 100 includes a plurality of antenna elements 41 to transmit or receive electromagnetic waves, a board 42 including the plurality of antenna elements 41, a radome 43 covering radiation surfaces of the plurality of antenna elements 41, and the metamaterial 1 attached to the radome 43. In FIG. 4, some part of the radome 43 and some part of the metamaterial 1 are not illustrated. The metamaterial 1 is attached to a surface of the radome 43 opposite to a surface facing the antenna elements 41, for example.

The metamaterial 1 can be bent as illustrated in FIG. 3, and can be thus attached to the radome 43 bent as illustrated in FIGS. 4 and 5. In order to attach the metamaterial 1 to the radome 43, thermal bonding is used, for example. Specifically, by heating the film 13 included in the metamaterial 1 to be melted and brought in contact with the radome 43 and then cooling the film 13, the film 13 adheres to the radome 43. As a result, the metamaterial 1 is attached to the radome 43.

Refraction of electromagnetic waves transmitted from the plurality of antenna elements 41 can be achieved by attachment of the metamaterial 1 to the radome 43. In the antenna 100 as illustrated in FIG. 5, for example, the metamaterial 1 refracts an electromagnetic wave transmitted from each of the antenna elements 41 in a direction away from a central axis AX2 indicating the center of the metamaterial 1 in the X-axis direction, and can expand the X-axis direction width of radiation range of the antenna 100. As a result, a scan range of the antenna 100 can be extended.

Figure 6:
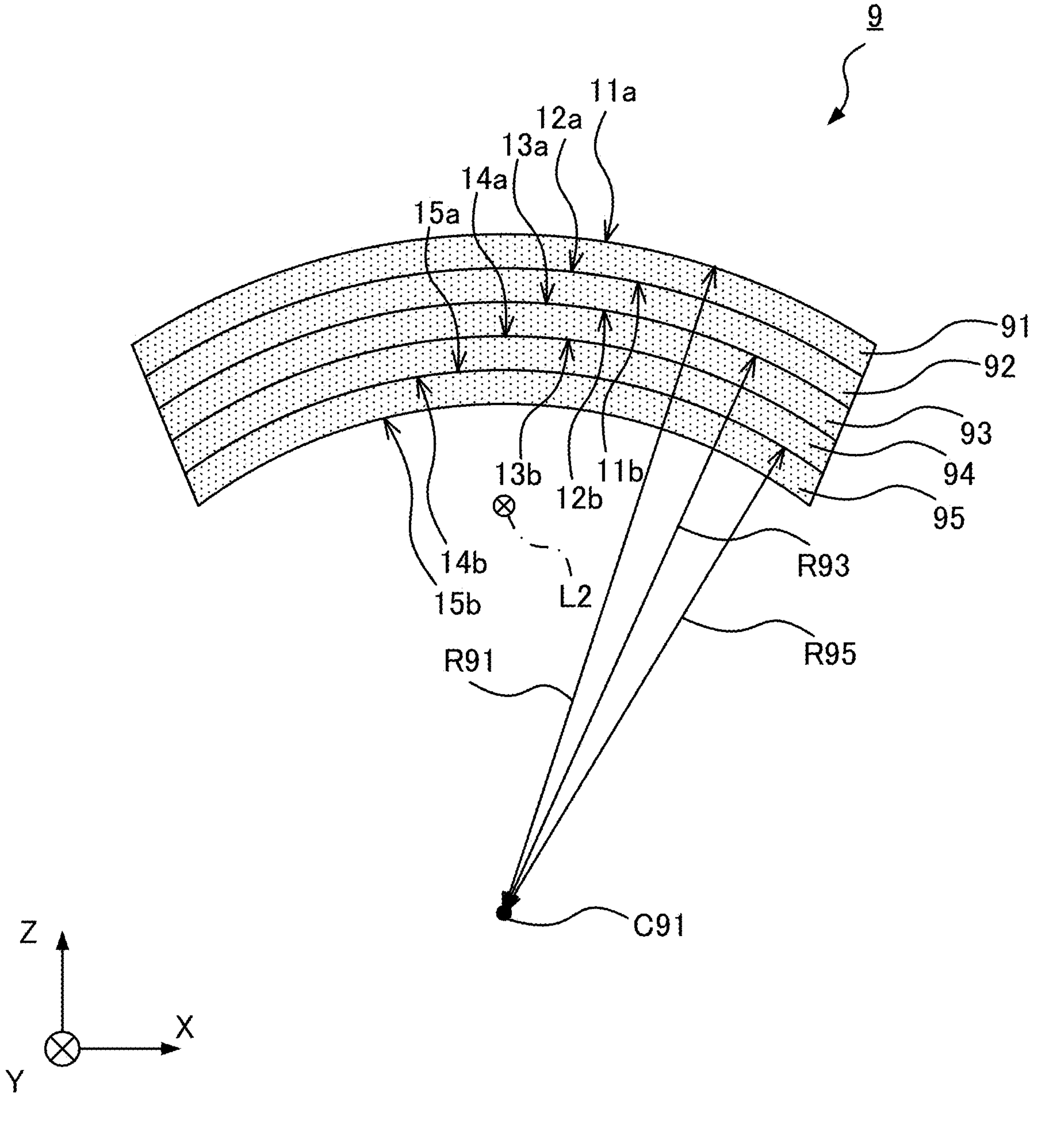
FIG. 6 is a sectional view of a metamaterial as a comparative example.

The following description is directed to a structure for suppressing application of excessive force to the micro-resonators 31 in the bent metamaterial 1. As a comparative example, a metamaterial 9 that does not include stress relieving members is illustrated in FIG. 6. The metamaterial 9 includes a plurality of films 91, 92, 93, 94, and 95 made of the same material and arranged in contact with each other, and a plurality of micro-resonators, which is not illustrated, included in each of the films 91, 92, 93, 94, and 95.

When the films 91 to 95 having a flat-plate shape are brought in contact with each other, fixed to each other with an adhesive or a pressure-sensitive adhesive, which is not illustrated, and bent by applying force similarly to the metamaterial 1, the obtained metamaterial 9 is bent around a bending line L2 as illustrated in FIG. 6.

In the bent metamaterial 9, the film 91 includes a convex surface 91*a* protruding in the Z-axis direction, and a concave surface 91*b* positioned on a side opposite to the convex surface 91*a* and recessed in the Z-axis direction. Similarly, the film 92 includes a convex surface 92*a* protruding in the Z-axis direction, and a concave surface 92*b* positioned on a side opposite to the convex surface 92*a* and recessed in the Z-axis direction. Similarly, the film 93 includes a convex surface 93*a* protruding in the Z-axis direction, and a concave surface 93*b* positioned on a side opposite to the convex surface 93*a* and recessed in the Z-axis direction. Similarly, the film 94 includes a convex surface 94*a* protruding in the Z-axis direction, and a concave surface 94*b* positioned on a side opposite to the convex surface 94*a* and recessed in the Z-axis direction. Similarly, the film 95 includes a convex surface 95*a* protruding in the Z-axis direction, and a concave surface 95*b* positioned on a side opposite to the convex surface 95*a* and recessed in the Z-axis direction. The concave surfaces 91*b*, 92*b*, 93*b*, and 94*b* are in contact with the convex surfaces 92*a*, 93*a*, 94*a*, and 95*a*, respectively.

When the films 91 to 95 fixed to each other are bent, films farther away from the bending line L2, such as the film 91, are more widely stretched in a circumferential direction around the bending line L2 than films closer to the bending line L2, such as the film 95. As a result, in the bent metamaterial 9, the shapes of the films 91 to 95 are different from each other. In other words, the curvatures of the convex surfaces 91*a*, 92*a*, 93*a*, 94*a*, and 95*a* are different from each other. Similarly, the curvatures of the concave surfaces 91*b*, 92*b*, 93*b*, 94*b*, and 95*b* are different from each other.

As illustrated in FIG. 6, in a section parallel to an XZ-plane, a circular arc corresponding to the convex surface 91*a*, a circular arc corresponding to the convex surface 93*a*, and a circular arc corresponding to the convex surface 95*a* are deemed to have a common center that is a point C91. Thus, a curvature radius R91 of the convex surface 91*a* is larger than a curvature radius R93 of the convex surface 93*a*. Since a tensile stress generated upon bending increases as a curvature radius increases, a larger tensile stress is generated in the bent film 91 than in the bent film 93.

The curvature radius R93 of the convex surface 93*a* is larger than a curvature radius R95 of the convex surface 95*a*. In other words, the curvature radius R95 of the convex surface 95*a* is smaller than the curvature radius R93 of the convex surface 93*a*. Since compressive stress generated upon bending increases as the curvature radius decreases, a larger compressive stress is generated in the bent film 95 than in the bent film 93.

Due to the large differences in the stresses generated in the films 91 to 95 as described above, larger force may be applied to some of the micro-resonators than the other micro-resonators in the metamaterial 9. Thus, the metamaterial 9 is to be bent such that force applied to the micro-resonators is within an acceptable range. Accordingly, when the metamaterial 9 is used in an antenna, the shape of a radome to which the metamaterial 9 is attached may be restricted.

Figure 7:
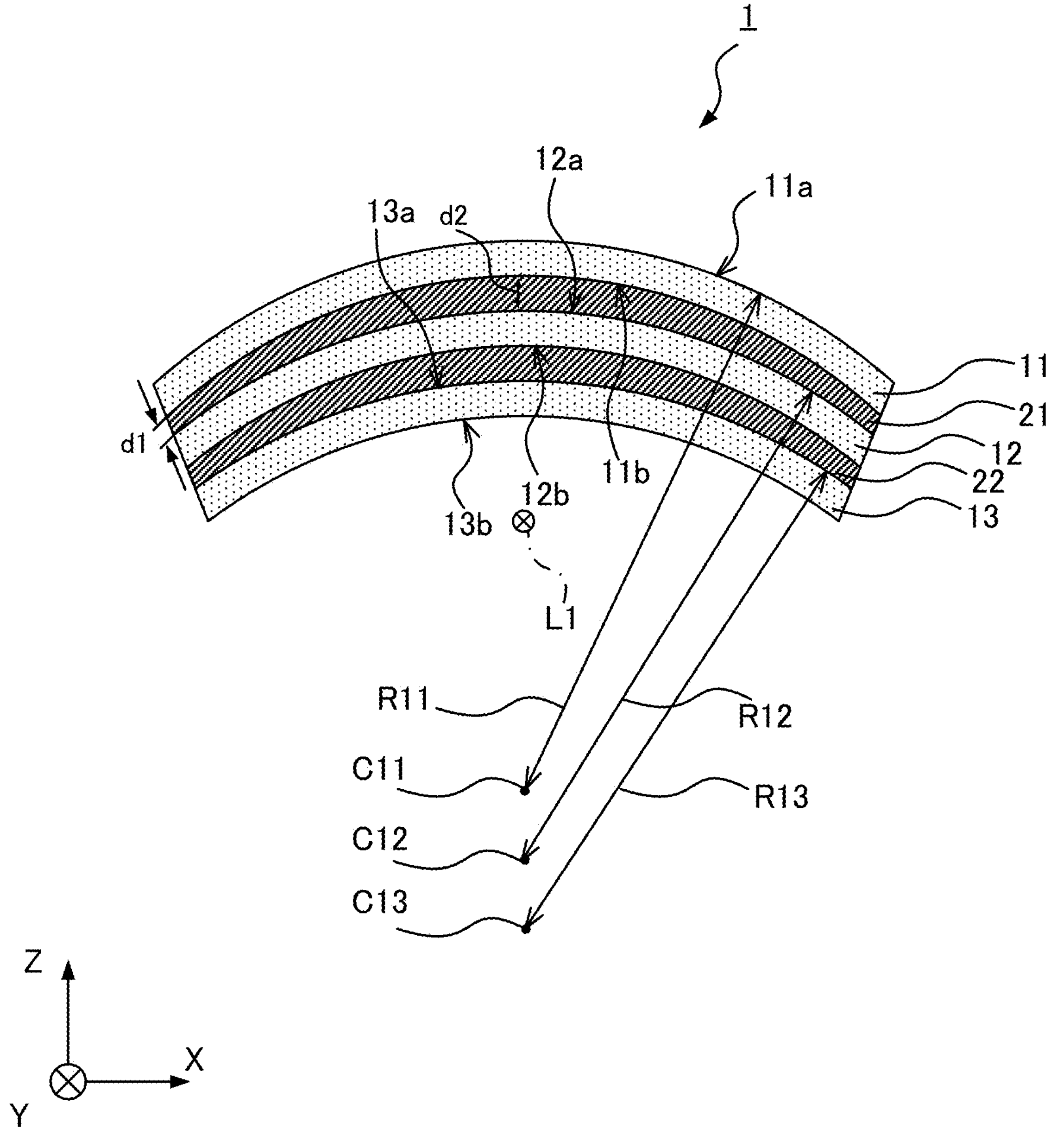
FIG. 7 is a sectional view of the metamaterial according to Embodiment 1.

In the metamaterial 1 as illustrated in FIG. 7, when the stresses generated in the films 11, 12, and 13 upon bending are transferred to the stress relieving members 21 and 22, the stress relieving members 21 and 22 having the lower elastic modulus than the films 11, 12, and 13 deform to a greater extent than the films 11, 12, and 13.

Specifically, in the bent metamaterial 1, the stress relieving member 21 has different thicknesses at different positions of the stress relieving member 21 in a sandwiching direction between the films 11 and 12. A thickness d1 of the stress relieving member 21 at the edges in the X-axis direction is smaller than a thickness d2 of the stress relieving member 21 at the center in the X-axis direction, for example. Similarly, in the bent metamaterial 1, the stress relieving member 22 has different thicknesses at different positions of the stress relieving member 22 in a sandwiching direction between the films 12 and 13.

Deformation of the stress relieving members 21 and 22 by receiving the force from the films 11, 12, and 13 as described above provides smaller differences in the shapes of the films 11, 12, and 13 compared with the differences in the case of the metamaterial 9.

In the section parallel to an XZ-plane, the center of a circular arc corresponding to the convex surface 11*a* is taken to be a point C11, the center of a circular arc corresponding to the convex surface 12*a* is taken to be a point C12, and the center of a circular arc corresponding to the convex surface 13*a* is taken to be a point C13. The points C11, C12, and C13 are positioned with spaces therebetween in the Z-axis direction. Differences in a curvature radius R11 of the convex surface 11*a*, a curvature radius R12 of the convex surface 12*a*, and a curvature radius R13 of the convex surface 13*a* are sufficiently reduced compared with the differences in the case of the metamaterial 9.

When the curvature radius R11 of the convex surface 11*a*, the curvature radius R12 of the convex surface 12*a*, and the curvature radius R13 of the convex surface 13*a* are deemed to be the same, for example, tensile stresses generated in the bent films 11, 12, and 13 are deemed to be the same. Similarly, when curvature radiuses of the concave surfaces 11*b*, 12*b*, and 13*b* are deemed to be the same, compressive stresses generated in the bent films 11, 12, and 13 are deemed to be the same.

The reduced differences in the stresses generated in the films 11 to 13 upon bending compared with the metamaterial 9 as described above can suppress application of excessive force to the micro-resonators 31 upon bending. When the metamaterial 1 is used in the antenna 100, restrictions on the shape of the radome 43 are reduced compared with the metamaterial 9.

As described above, the metamaterial 1 according to Embodiment 1 including the stress relieving members 21 and 22 reduces differences in degrees of deformation of the films 11, 12, and 13 due to bending, and suppresses excessive force applied to the micro-resonators 31 included in the films 11, 12, and 13. Since the excessive force applied to the micro-resonators 31 upon bending is suppressed, restrictions on deformation of the metamaterial 1 are reduced, and the metamaterial 1 becomes attachable to a curved surface.

Embodiment 2

The structure of the metamaterial 1 is not limited to that of the above example. A metamaterial 2 including spacers to regulate spaces between the films 11 to 13 in the arrangement direction is described in Embodiment 2, focusing on differences from the metamaterial 1 according to Embodiment 1.

Figure 8:
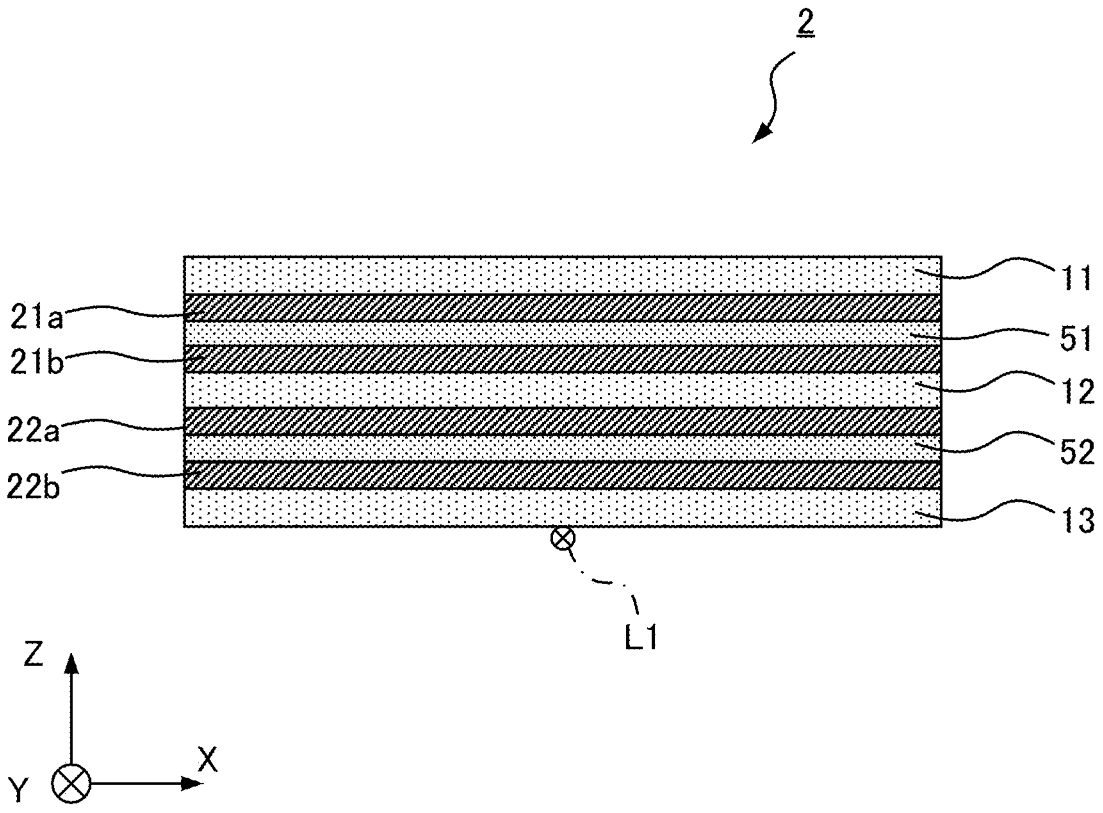
FIG. 8 is a sectional view of a metamaterial according to Embodiment 2.
Figure 9:
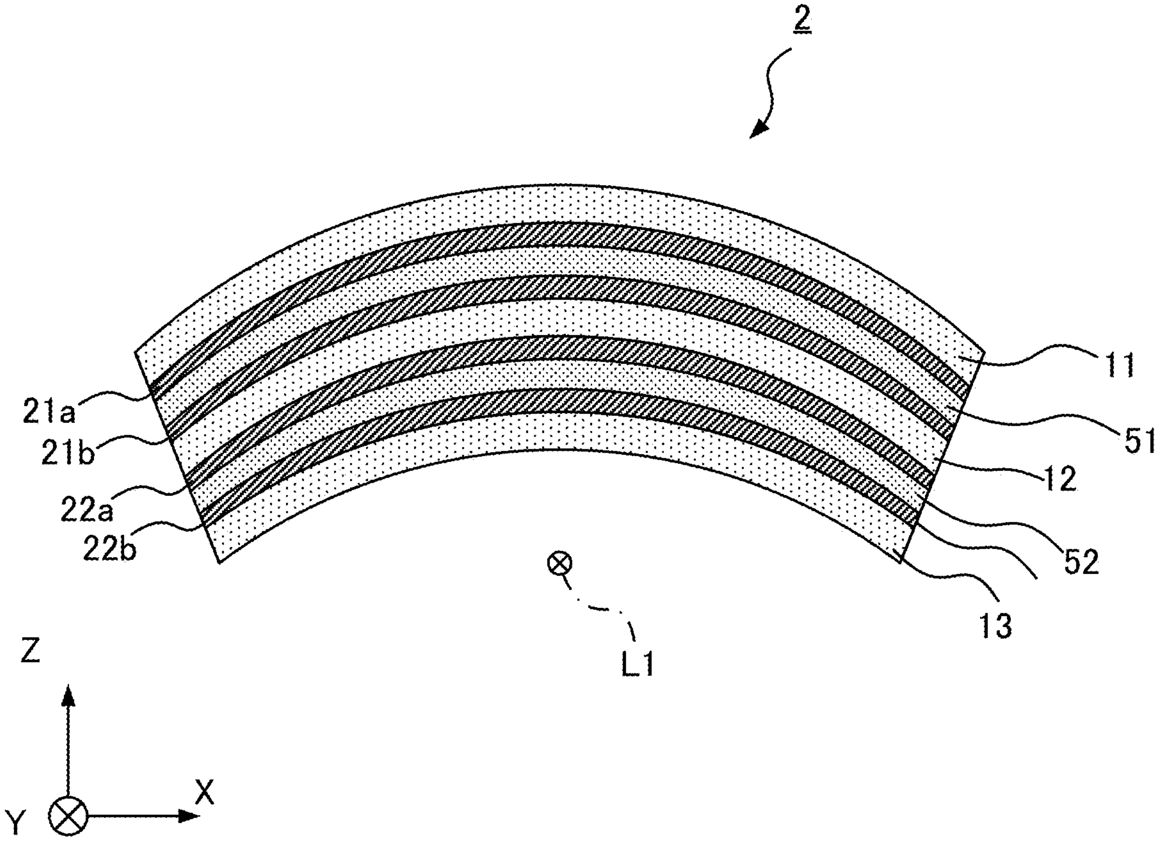
FIG. 9 is a sectional view of the metamaterial according to Embodiment 2.

The metamaterial 2 as illustrated in FIGS. 8 and 9 includes stress relieving members 21*a* and 21*b* disposed between the mutually-adjacent films 11 and 12, stress relieving members 22*a* and 22*b* disposed between the mutually-adjacent films 12 and 13, a spacer 51 disposed between the stress relieving members 21*a* and 21*b*, and a spacer 52 disposed between the stress relieving members 22*a* and 22*b*. Inclusion of the spacers 51 and 52 allows regulation of spaces between the films 11, 12, and 13 to achieve desired electromagnetic properties of the metamaterial 2.

The stress relieving member 21*a* is in contact with the film 11 and the spacer 51, and the stress relieving member 21*b* is in contact with the film 12 and the spacer 51. The stress relieving member 22*a* is in contact with the film 12 and the spacer 52, and the stress relieving member 22*b* is in contact with the film 13 and the spacer 52.

The stress relieving members 21*a*, 21*b*, 22*a*, and 22*b* are made of the same material as the stress relieving members 21 and 22 included in the metamaterial 1 according to Embodiment 1. Thus, the stress relieving members 21*a*, 21*b*, 22*a*, and 22*b* have a lower elastic modulus than the films 11, 12, and 13 and deform when receiving stresses generated in the films 11, 12, and 13 upon bending of the metamaterial 2. Deformation of the stress relieving members 21*a*, 21*b*, 22*a*, and 22*b* suppresses transfer, among the films 11, 12, and 13, of the stresses generated upon bending.

The spacers 51 and 52 transmit the target electromagnetic wave and have a higher elastic modulus than the stress relieving members 21*a*, 21*b*, 22*a*, and 22*b*. The spacers 51 and 52 are made of the same material as the films 11, 12, and 13, for example. In this case, the spacers 51 and 52 deform similarly to the films 11, 12, and 13. The spacer 51 disposed between the stress relieving members 21*a* and 21*b* is in contact with the stress relieving members 21*a* and 21*b*. The spacer 52 disposed between the stress relieving members 22*a* and 22*b* is in contact with the stress relieving members 22*a* and 22*b*.

The thicknesses of the spacers 51 and 52 are determined in accordance with electromagnetic properties desired for the metamaterial 2. In accordance with the thicknesses of the spacers 51 and 52, spaces between the micro-resonators 31 included in each of the films 11, 12, and 13 can be regulated to change the electromagnetic properties of the metamaterial 2.

When no external force is applied, as illustrated in FIG. 8, the films 11, 12, and 13, the stress relieving members 21*a*, 21*b*, 22*a*, and 22*b*, and the spacers 51 and 52 have a flat-plate shape. The film 13, the stress relieving member 22*b*, the spacer 52, the stress relieving member 22*a*, the film 12, the stress relieving member 21*b*, the spacer 51, the stress relieving member 21*a*, and the film 11 are laminated in this order.

By applying force, in the same manner as Embodiment 1, to the metamaterial 2 in a state illustrated in FIG. 8, the obtained metamaterial 2 is bent as illustrated in FIG. 9. As a result, the metamaterial 2 becomes attachable to a curved surface.

As described above, in the metamaterial 2 according to Embodiment 2 including the spacers 51 and 52, the spaces between the films 11, 12, and 13 can be regulated to achieve the desired electromagnetic properties of the metamaterial 2.

The present disclosure is not limited to the above embodiments. In the metamaterial 2, a plurality of spacers may be disposed between two mutually-adjacent films, more specifically, between the films 11 and 12 and between the films 12 and 13, for example.

Figure 10:
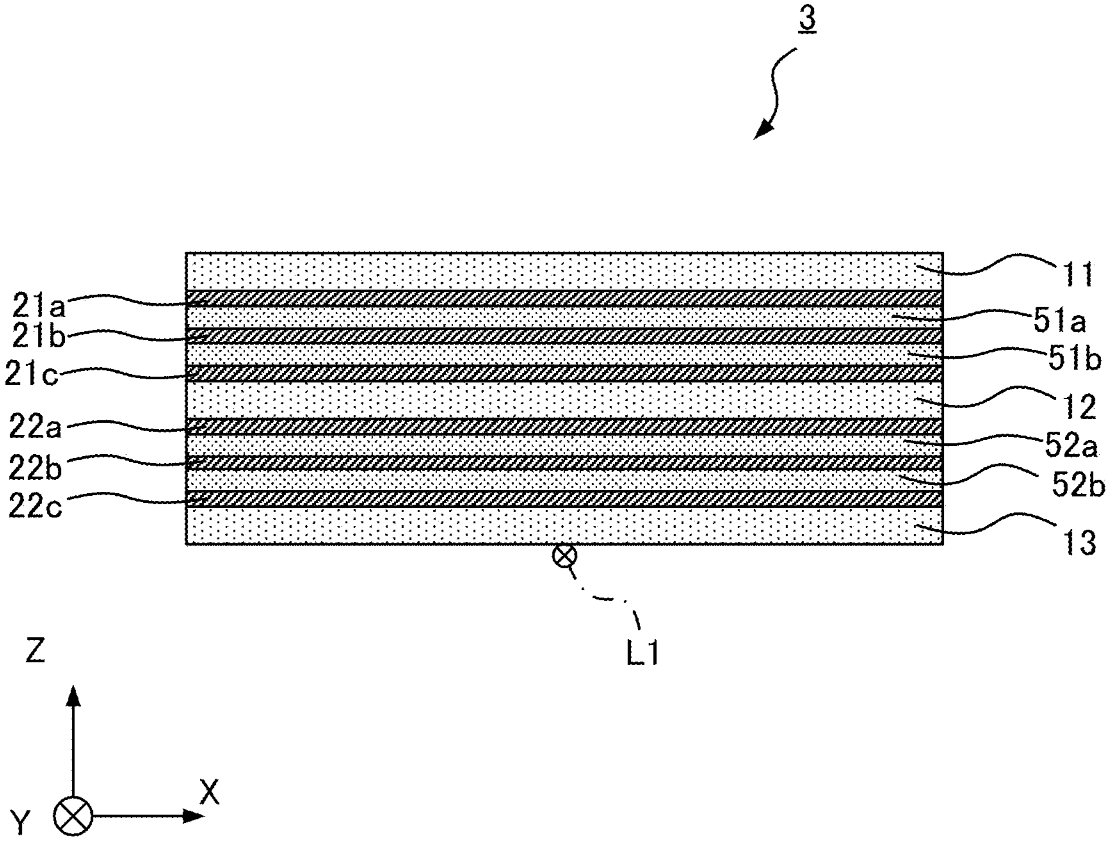
FIG. 10 is a sectional view of a first modified example of the metamaterial according to the embodiments.

The metamaterial 3 as illustrated in FIG. 10 includes stress relieving members 21*a*, 21*b*, and 21*c* disposed between the films 11 and 12, a spacer 51*a* disposed between the stress relieving members 21*a* and 21*b*, and a spacer 51*b* disposed between the stress relieving members 21*b* and 21*c*. The metamaterial 3 further includes stress relieving members 22*a*, 22*b*, and 22*c* disposed between the films 12 and 13, a spacer 52*a* disposed between the stress relieving members 22*a* and 22*b*, and a spacer 52*b* disposed between the stress relieving members 22*b* and 22*c*.

The stress relieving members 21*a*, 21*b*, 21*c*, 22*a*, 22*b*, and 22*c* are made of the same material as the stress relieving members 21 and 22 included in the metamaterial 1 according to Embodiment 1. The spacers 51*a*, 51*b*, 52*a*, and 52*b* are made of the same material as the spacers 51 and 52 included in the metamaterial 2 according to Embodiment 2.

Inclusion of the plurality of spacers 51*a* and 51*b* disposed between the films 11 and 12 and inclusion of the plurality of spacers 52*a* and 52*b* disposed between the films 12 and 13 allows expansion of the spaces between the films 11, 12, and 13 and regulation of the spaces to be desired values.

Figure 11:
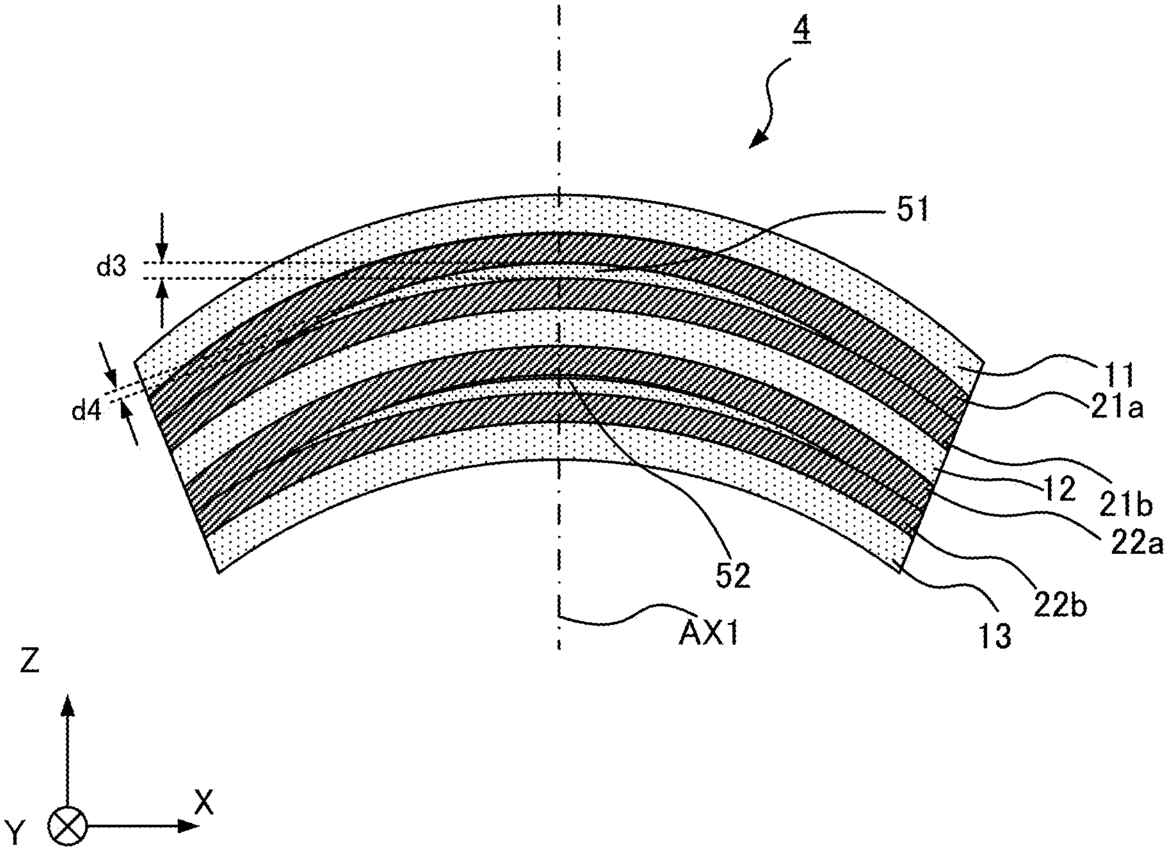
FIG. 11 is a sectional view of a second modified example of the metamaterial according to the embodiments.

The shape of the spacers is not limited to that of the above examples. As an example, a metamaterial 4 including the spacers 51 and 52 each having a non-uniform thickness is illustrated in FIG. 11. The spacer 51 included in the metamaterial 4 has different thicknesses at different positions of the spacer 51 in a sandwiching direction in between the stress relieving members 21*a* and 21*b*. Specifically, a thickness d3 of the spacer 51 at the center in the X-axis direction is larger than a thickness d4 of the spacer 51 at the edges in the X-axis direction. Similarly, the spacer 52 has different thicknesses at different positions of the spacer 52 in the sandwiching direction between the stress relieving members 22*a* and 22*b*.

As illustrated in FIG. 11, the area of a main surface of the spacer 51 in contact with the stress relieving member 21*a* may be smaller than the area of a main surface of the stress relieving member 21*a*. Similarly, the area of a main surface of the spacer 51 in contact with the stress relieving member 21*b* may be smaller than the area of a main surface of the stress relieving member 21*b*. The area of a main surface of the spacer 52 in contact with the stress relieving member 22*a* may be smaller than the area of a main surface of the stress relieving member 22*a*. Similarly, the area of a main surface of the spacer 52 in contact with the stress relieving member 22*b* may be smaller than the area of a main surface of the stress relieving member 22*b*. The smaller areas of the main surfaces of the spacers 51 and 52 than the areas of the stress relieving members 21*a*, 21*b*, 22*a*, and 22*b* allow, at the edges in the X-axis direction, the stress relieving members 21*a* and 21*b* to be in contact with each other, and the stress relieving members 22*a* and 22*b* to be in contact with each other. This can provide a reduced thickness of the metamaterial 4 at the edges in the X-axis direction.

The non-uniform thicknesses of the spacers 51 and 52 allow the films 11, 12, and 13 to have different curvatures. Due to the curvature of the film 11 being smaller than the curvatures of the films 12 and 13, for example, an electromagnetic wave that has entered the metamaterial 4 from the film 13 is refracted in the direction away from the central axis AX1 indicating the center of the metamaterial 4 in the X-axis direction, and comes out of the film 11. As a result, when the metamaterial 4 is used in the antenna 100 as illustrated in FIGS. 4 and 5, the metamaterial 4 refracts electromagnetic waves output by the antenna elements 41 in the direction farther away from the central axis AX2, and can provide an expanded scan range, compared with the metamaterial 1.

The shape of the stress relieving members is not limited to that of the above examples. As an example, a metamaterial 5 including the stress relieving member 21*a* having a non-uniform thickness is illustrated FIG. 12. The metamaterial 5 includes the films 11, 12, and 13, the stress relieving members 21*a*, 21*b*, and 21*c* disposed between the films 11 and 12, and the stress relieving member 22 disposed between the films 12 and 13. The metamaterial 5 further includes the spacer 51*a* disposed between the stress relieving members 21*a* and 21*b*, and the spacer 51*b* disposed between the stress relieving members 21*b* and 21*c*.

In a state in which the stress relieving member 21*a* is not deformed by receiving force from the film 11 in contact with the stress relieving member 21*a*, the stress relieving member 21*a* has different thicknesses at different positions of the stress relieving member 21*a* in a sandwiching direction between the films 11 and 12. The thickness of the stress relieving member 21*a* at the center in the X-axis direction is larger than the thickness of the stress relieving member 21*a* at the edges in the X-axis direction, for example.

The width of the spacer 51*a* in the X-axis direction is shorter than the X-axis direction width of the spacer 51*b*. The area of a main surface of the spacer 51*a* in contact with the stress relieving member 21*a* is smaller than the area of a main surface of the stress relieving member 21*a*. The area of a main surface of the spacer 51*a* in contact with the stress relieving member 21*b* is smaller than the area of a main surface of the stress relieving member 21*b*. The area of a main surface of the spacer 51*b* in contact with the stress relieving member 21*b* is smaller than the area of a main surface of the stress relieving member 21*b*. The area of a main surface of the spacer 51*b* in contact with the stress relieving member 21*c* is smaller than the area of a main surface of the stress relieving member 21*c*.

Figure 12:
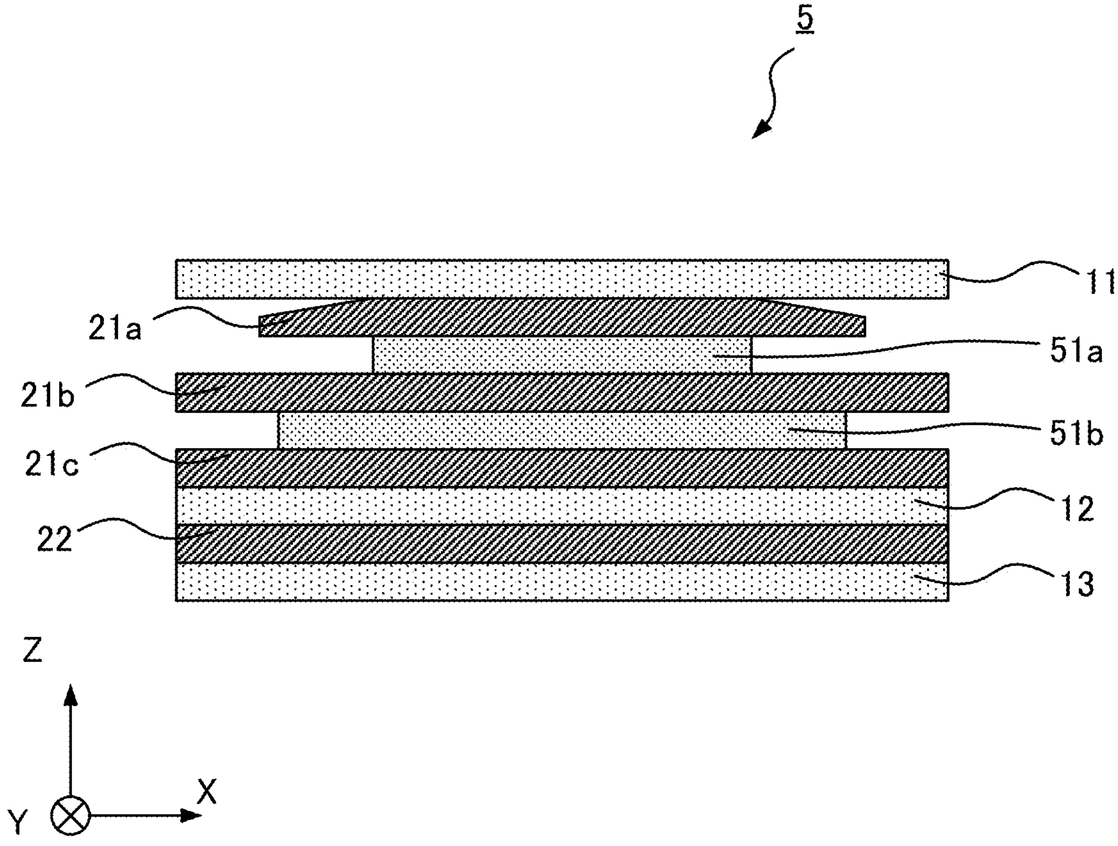
FIG. 12 is a sectional view of a third modified example of the metamaterial according to the embodiments.
Figure 13:
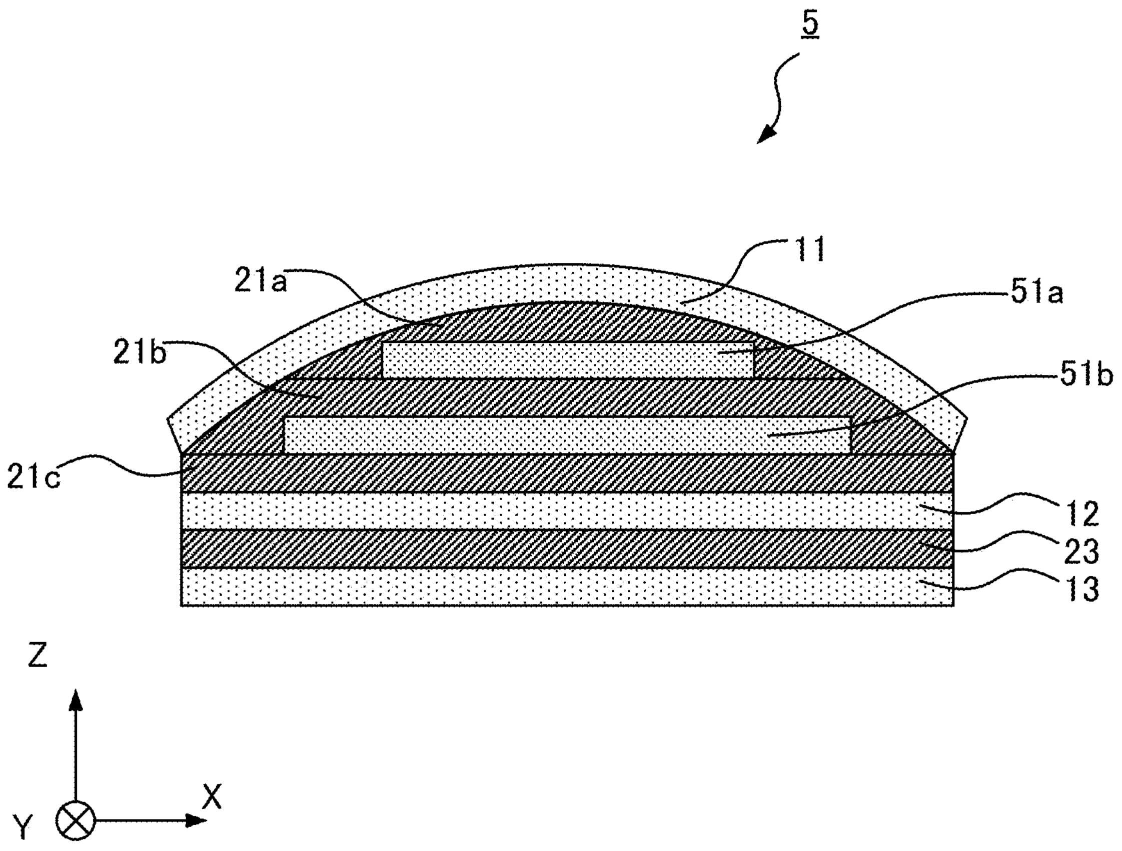
FIG. 13 is a sectional view of the third modified example of the metamaterial according to the embodiments.

By applying force to the metamaterial 5 as illustrated in FIG. 12 from upward in the Z-axis direction toward the negative Z-axis direction of the film 11, the film 11 is deformed along the stress relieving member 21*a* and brought in contact with the stress relieving member 21*b*. As a result, in the metamaterial 5, the film 11 is bent, and the films 12 and 13 have a flat-plate shape as illustrated in FIG. 13. The shape of the stress relieving member 21*a* having the non-uniform thickness allows the film 11 to be bent and the films 12 and 13 to have a flat-plate shape.

Figure 14:
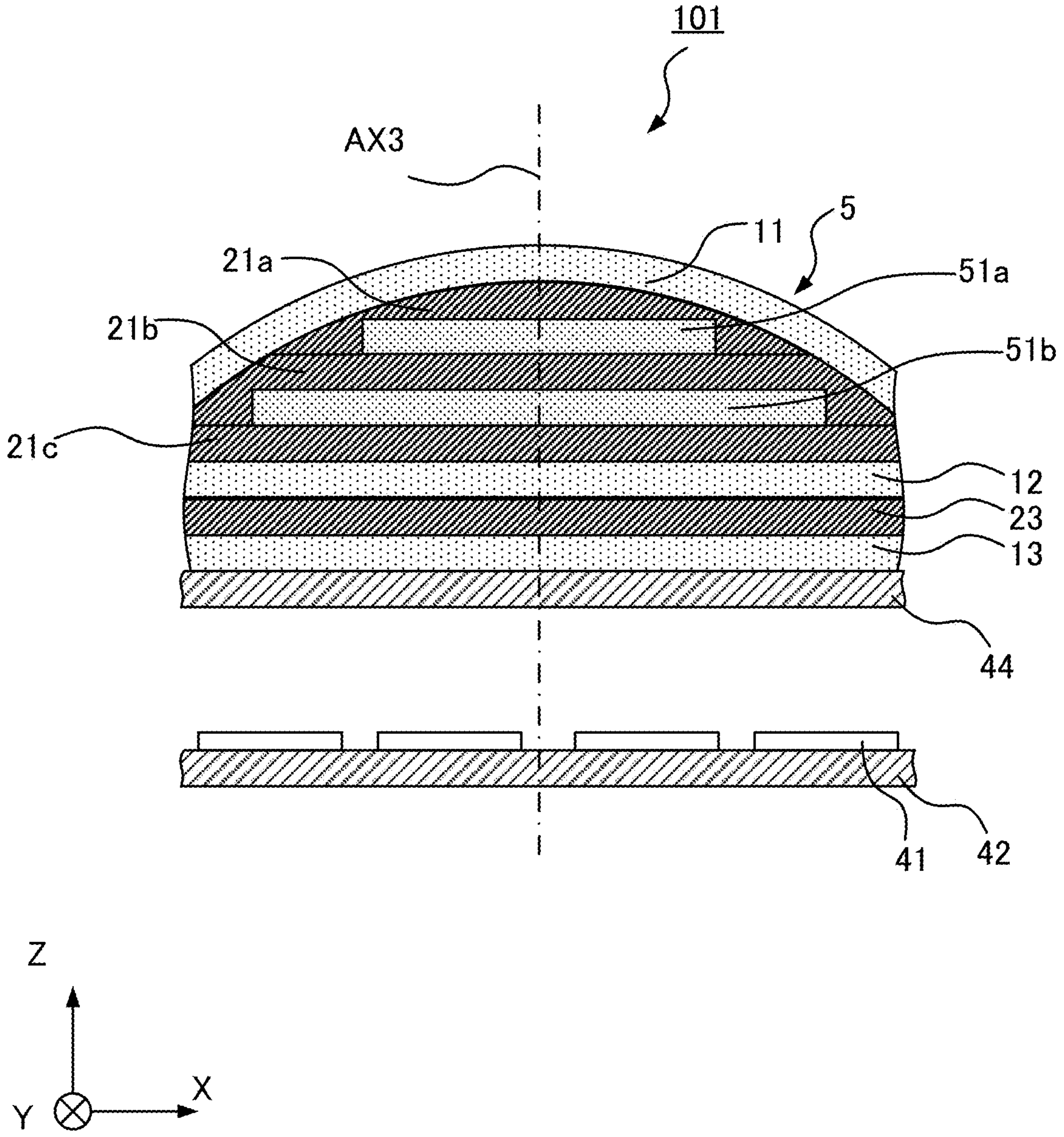
FIG. 14 is a sectional view of a modified example of the antenna according to the embodiments.

The metamaterial 5 including the above structure is used in an antenna 101 as illustrated in FIG. 14. The antenna 101 includes a radome 44 having a flat surface. The metamaterial 5 is attached to the radome 44. As a result, the electromagnetic waves output from the antenna elements 41 are refracted in a direction away from a central axis AX3 so that a scanning direction expands.

Figure 15:
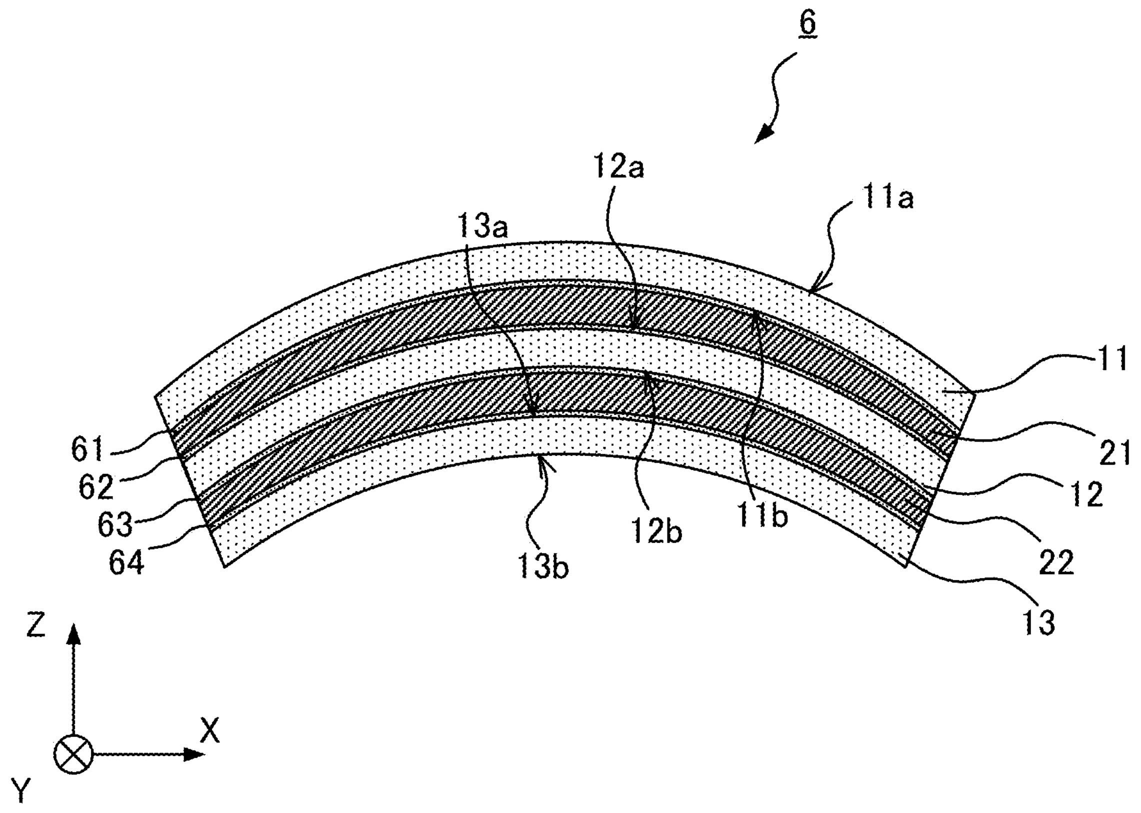
FIG. 15 is a sectional view of a fourth modified example of the metamaterial according to the embodiments.

The method of attachment of the films and the stress relieving members is not limited to that of the above examples. As an example, a metamaterial 6 including attachment materials to cause the films and the stress relieving members to adhere or pressure-sensitively adhere to each other is illustrated in FIG. 15. The metamaterial 6 includes, in addition to the structure of the metamaterial 1, attachment materials 61, 62, 63, and 64 made of an adhesive or a pressure-sensitive adhesive.

The attachment materials 61, 62, 63, and 64 are made of an acrylic pressure-sensitive adhesive, a silicone pressure-sensitive adhesive, a urethane pressure-sensitive adhesive, a rubber pressure-sensitive adhesive, a silicone adhesive, or an acrylic adhesive, for example. The attachment materials 61, 62, 63, and 64 may be made of the same material, or at least one of the attachment materials 61, 62, 63, and 64 may be made of a different material.

The attachment material 61 is in contact with the film 11 and the stress relieving member 21, and causes the film 11 and the stress relieving member 21 to adhere or pressure-sensitively adhere to each other. The attachment material 62 is in contact with the film 12 and the stress relieving member 21, and causes the film 12 and the stress relieving member 21 to adhere or pressure-sensitively adhere to each other. The attachment material 63 is in contact with the film 12 and the stress relieving member 22, and causes the film 12 and the stress relieving member 22 to adhere or pressure-sensitively adhere to each other. The attachment material 64 is in contact with the film 13 and the stress relieving member 22, and causes the film 13 and the stress relieving member 22 to adhere or pressure-sensitively adhere to each other.

The metamaterial 6 including the attachment materials 61, 62, 63, and 64 as described above allows the stress relieving member 21 to be attached to films 11 and 12 and the stress relieving member 22 to be attached to films 12 and 13. As a result, mutual misalignment of the components of the metamaterial 6, more specifically, mutual misalignment of the films 11, 12, and 13 and the stress relieving members 21 and 22 can be suppressed.

In another example, the films 11, 12, and 13 and the stress relieving members 21 and 22 may adhere to each other by thermal bonding.

The method of deformation of films 11, 12, and 13 is not limited to that of the above examples. The films 11, 12, and 13 may be deformed in any manner in accordance with the shapes of positions to which the metamaterials 1 to 6 are attached. In an example, the convex surface 11*a* and the concave surface 11*b* included in the deformed film 11, the convex surface 12*a* and the concave surface 12*b* included in the deformed film 12, and the convex surface 13*a* and the concave surface 13*b* included in the deformed film 13 may have a shape like a portion of a spherical surface. In this case, the metamaterial 1 deformed as described above attached to the radome 43 can expand the X-axis direction and Y-axis direction widths of the radiation range of the antenna 100 and extend the scan range.

The position of attachment of the metamaterial 1 to the radome 43 is not limited to that of the above examples. In an example, the metamaterial 1 may be attached to a surface of the radome 43 facing the antenna elements 41. The same applies to the metamaterials 2 to 4 and 6.

The material used for the metamaterials 1 to 6 may have plasticity. In an example, the stress relieving members 21 and 22 in the metamaterial 1 may be made of a material having plasticity.

The shape of the micro-resonators 31 is not limited to that of the above examples. The micro-resonators 31 are any resonators that resonate with the target electromagnetic wave. The shape of the micro-resonators 31 may be a circular arc, a U shape, a V shape, an L shape, a lattice, a spiral, or a circle, for example.

The target electromagnetic wave may be an electromagnetic wave other than the electromagnetic wave within the gigahertz range. In an example, the target electromagnetic wave may be an electromagnetic wave within a terahertz range, such as an electromagnetic wave having a wavelength of 300 μm or more and 3 mm or less.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1, 2, 3, 4, 5, 6, 9 Metamaterial
11, 12, 13, 91, 92, 93, 94, 95 Film

11*a*, 12*a*, 13*a*, 91*a*, 92*a*, 93*a*, 94*a*, 95*a* Convex surface
11*b*, 12*b*, 13*b*, 91*b*, 92*b*, 93*b*, 94*b*, 95*b* Concave surface
21, 22, 21*a*, 21*b*, 21*c*, 22*a*, 22*b*, 22*c* Stress relieving member
31 Micro-resonator
41 Antenna element
42 Board
43, 44 Radome
51, 52, 51*a*, 51*b*, 52*a*, 52*b* Spacer
61, 62, 63, 64 Attachment material
100, 101 Antenna
AX1, AX2, AX3 Central axis
C1, C2, C3, C91 Point
d1, d2, d3, d4 Thickness
L1, L2 Bending line
R11, R12, R13, R91, R93, R95 Curvature radius

The invention claimed is:

1. A metamaterial, comprising:

a plurality of films arranged with main surfaces thereof facing each other and configured to transmit a target electromagnetic wave that is an electromagnetic wave having a wavelength within a target wavelength range;

a plurality of micro-resonators each made of an electrically conductive material, included in each of the plurality of films, and configured to resonate with the target electromagnetic wave; and a stress relieving member disposed between two mutually-adjacent films of the plurality of films, configured to transmit the target electromagnetic wave, and having a lower elastic modulus than the plurality of films, wherein each of the plurality of films has one main surface forming a convex surface protruding in an arrangement direction of the plurality of films, and the other main surface forming a concave surface positioned on a side opposite to the convex surface and recessed in the arrangement direction, and the convex surfaces of at least two films of the plurality of films have a same curvature.

2. A metamaterial, comprising:

a plurality of films arranged with main surfaces thereof facing each other and configured to transmit a target electromagnetic wave that is an electromagnetic wave having a wavelength within a target wavelength range;

a plurality of micro-resonators each made of an electrically conductive material, included in each of the plurality of films, and configured to resonate with the target electromagnetic wave; and a stress relieving member disposed between two mutually-adjacent films of the plurality of films, configured to transmit the target electromagnetic wave, and having a lower elastic modulus than the plurality of films, wherein each of the plurality of films has one main surface forming a convex surface protruding in an arrangement direction of the plurality of films, and the other main surface forming a concave surface positioned on a side opposite to the convex surface and recessed in the arrangement direction, and the concave surfaces of at least two films of the plurality of films have a same curvature.

3. The metamaterial according to claim 1, wherein each of the plurality of films has one main surface forming a convex surface protruding in an arrangement direction of the plurality of films, and the other main surface forming a concave surface positioned on a side opposite to the convex surface and recessed in the arrangement direction, and the concave surfaces of at least two films of the plurality of films have a same curvature.

4. A metamaterial, comprising:

a plurality of films arranged with main surfaces thereof facing each other and configured to transmit a target electromagnetic wave that is an electromagnetic wave having a wavelength within a target wavelength range;

a plurality of micro-resonators each made of an electrically conductive material, included in each of the plurality of films, and configured to resonate with the target electromagnetic wave; and a stress relieving member disposed between two mutually-adjacent films of the plurality of films, configured to transmit the target electromagnetic wave, and having a lower elastic modulus than the plurality of films, wherein the stress relieving member has different thicknesses at different positions of the stress relieving member in a sandwiching direction between the plurality of films, in a state in which the stress relieving member is not deformed by receiving force from the plurality of films in contact with the stress relieving member.

5. The metamaterial according to claim 1, wherein the stress relieving member has different thicknesses at different positions of the stress relieving member in a sandwiching direction between the plurality of films, in a state in which the stress relieving member is not deformed by receiving force from the plurality of films in contact with the stress relieving member.

6. The metamaterial according to claim 2, wherein the stress relieving member has different thicknesses at different positions of the stress relieving member in a sandwiching direction between the plurality of films, in a state in which the stress relieving member is not deformed by receiving force from the plurality of films in contact with the stress relieving member.

7. The metamaterial according to claim 1, wherein the stress relieving member is in contact with each of the two mutually-adjacent films sandwiching the stress relieving member therebetween.

8. The metamaterial according to claim 2, wherein the stress relieving member is in contact with each of the two mutually-adjacent films sandwiching the stress relieving member therebetween.

9. A metamaterial, comprising:

a plurality of films arranged with main surfaces thereof facing each other and configured to transmit a target electromagnetic wave that is an electromagnetic wave having a wavelength within a target wavelength range;

a plurality of micro-resonators each made of an electrically conductive material, included in each of the plurality of films, and configured to resonate with the target electromagnetic wave; and a stress relieving member disposed between two mutually-adjacent films of the plurality of films, configured to transmit the target electromagnetic wave, and having a lower elastic modulus than the plurality of films, wherein a plurality of the stress relieving members are disposed between the two mutually-adjacent films, and the metamaterial further comprises a spacer disposed between the plurality of stress relieving members, configured to transmit the target electromagnetic wave, and having a higher elastic modulus than the plurality of stress relieving members.

10. The metamaterial according to claim 2, wherein a plurality of the stress relieving members are disposed between the two mutually-adjacent films, and the metamaterial further comprises a spacer disposed between the plurality of stress relieving members, configured to transmit the target electromagnetic wave, and having a higher elastic modulus than the plurality of stress relieving members.

11. The metamaterial according to claim 9, wherein the spacer has different thicknesses at different positions of the spacer in a sandwiching direction between the plurality of stress relieving members.

12. The metamaterial according to claim 9, wherein a main surface of the spacer facing the plurality of stress relieving members has an area smaller than an area of a main surface of the stress relieving member in contact with the main surface of the spacer.

13. The metamaterial according to claim 9, wherein the spacer is made of a same material as the plurality of films.

14. The metamaterial according to claim 1, wherein the stress relieving member is made of a member adherent or pressure-sensitively adherent to the plurality of films.

15. The metamaterial according to claim 1, further comprising:

an attachment material to cause the stress relieving member to adhere or pressure-sensitively adhere to the plurality of films.

16. An antenna, comprising:

a plurality of antenna elements to transmit or receive an electromagnetic wave;

a radome covering radiation surfaces of the plurality of antenna elements; and the metamaterial according to claim 1, the metamaterial being disposed on the radome.

17. The metamaterial according to claim 1, wherein each of the micro-resonators includes a split-ring resonator having a partially circular shape.

* * * * *